Nov. 6, 1923.

E. SCHNEIDER

CLUTCH CLOSING MECHANISM

Filed Oct. 29, 1920  4 Sheets-Sheet 1

Nov. 6, 1923.
E. SCHNEIDER
1,472,854
CLUTCH CLOSING MECHANISM
Filed Oct. 29, 1920
4 Sheets-Sheet 2
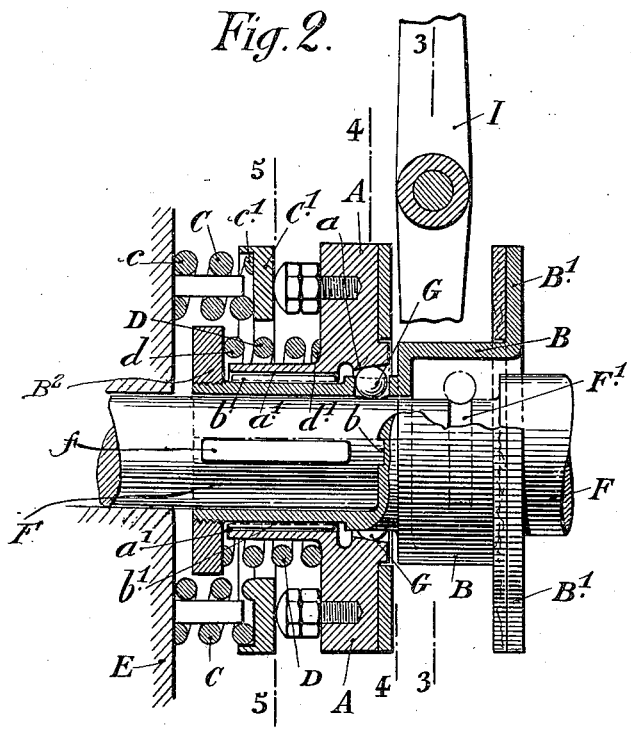
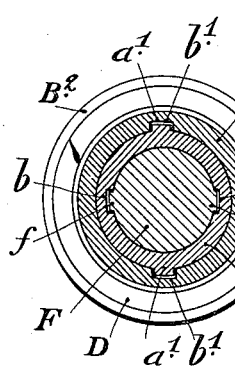
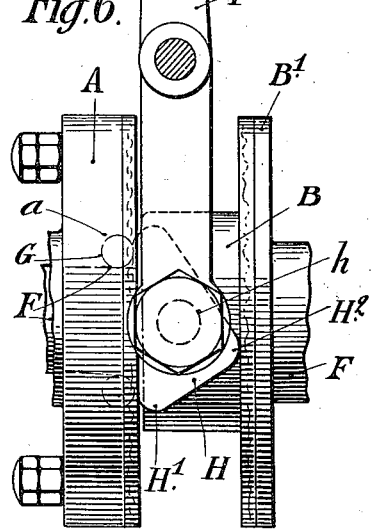

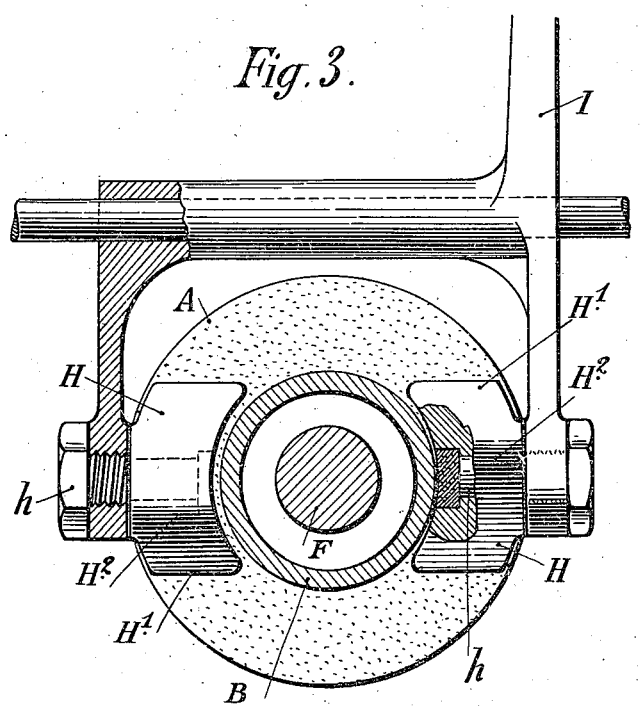
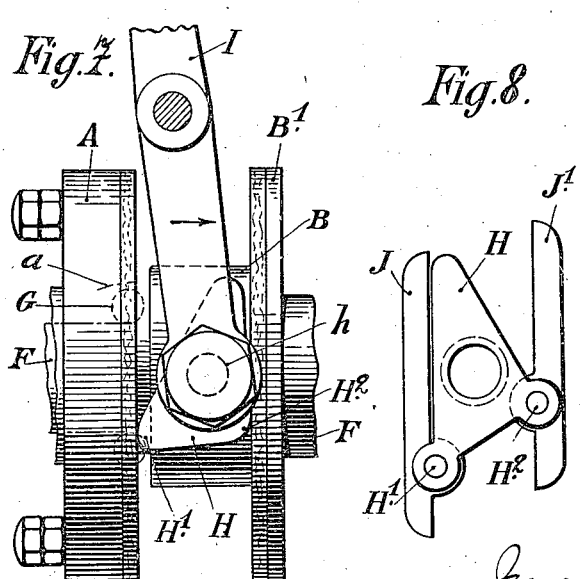

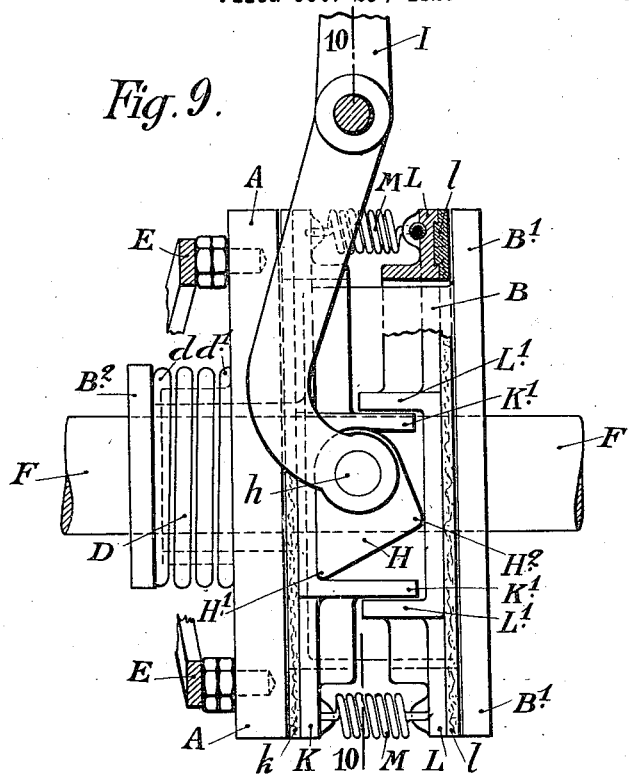
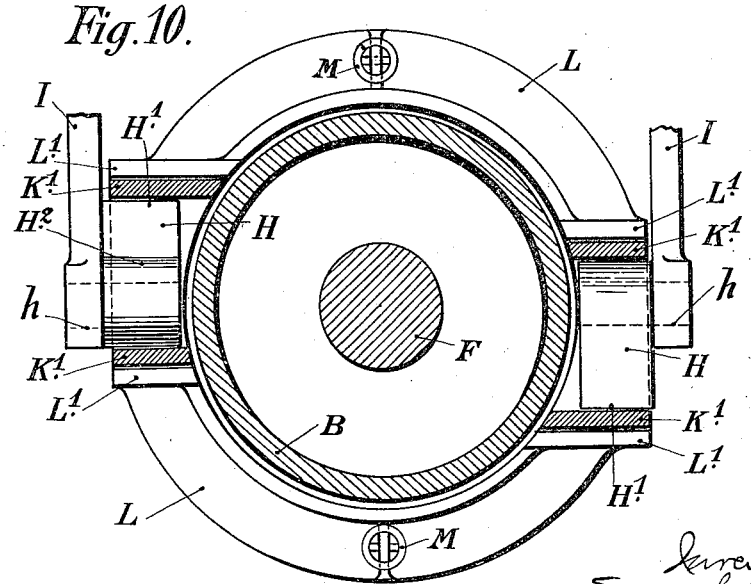

Patented Nov. 6, 1923.

1,472,854

UNITED STATES PATENT OFFICE.

EUGÈNE SCHNEIDER, OF PARIS, FRANCE, ASSIGNOR TO SCHNEIDER & CIE, OF PARIS, FRANCE, A LIMITED JOINT STOCK COMPANY OF FRANCE.

CLUTCH-CLOSING MECHANISM.

Application filed October 29, 1920. Serial No. 420,525.

*To all whom it may concern:*

Be it known that I, EUGÈNE SCHNEIDER, a citizen of the Republic of France, and resident of Paris, France, have invented new and useful Improvements in Clutch-Closing Mechanism, which invention is fully set forth in the following specification.

This invention consists in improvements in automatic tensioning apparatus of the type that is more particularly applicable to clutches, and is described and illustrated in French Patent No. 393,422 of August 14, 1908 and in patent addition No. 13,598 of December 19, 1910.

Where springs are employed to produce clutch engagement, it is ordinarily necessary to give these springs a certain tension, which tension cannot be changed without introducing permanent and harmful friction.

One of the objects of the present invention is to provide an improved automatic tensioning device, of the type disclosed by the French patent referred to above, which will enable an operator to modify at will the tension of a spring mounted upon a movable shaft, and to maintain this tension.

A diagram of the above referred to type of tensioning apparatus is illustrated in Fig. 1 of the accompanying drawings.

In this diagram, E indicates one of the parts of a clutch such as is disclosed in the French Patent No. 393,422, mounted on the driven shaft F. The clutch is normally held closed by a spring C whose tension can be varied at will. This known apparatus, of which the present invention constitutes an improvement, is nothing other than an abutment of peculiar construction for one of the ends $c^1$ of the spring whose other end $c$ bears against the clutch part E. The peculiar abutment is constituted by a sleeve A arranged around the shaft F, and by jamming members, such as balls G, that are normally kept jammed between the shaft F and the suitably shaped inner wall of the supporting sleeve A. For the purpose of varying the position of the sleeve A, and thus the tension of spring C it is necessary, when it is desired to move the said sleeve away from the clutch part E, to first effect an "unjamming" of the jamming members. For this purpose the members G are in the known apparatus, arranged in an annulus B against which there bears one end $d$ of the spring D, the other end $d^1$ of which bears against the sleeve A, and normally holds the balls G in the jamming position. Separating members H pivoted on axle-pins $h$, carried by an operating member I, allow of producing, for the purpose of moving back the whole combination A—B—G, first by the action of a nose $H^1$, a pressure upon the sleeve A in the opposite direction to the action of the spring C, and thus counter-balancing the pressure of the said spring while the balls are held in their non-jamming position.

At the same time the separators H act with an opposite nose $H^2$ upon the jamming members G through the medium of the annulus B in which the latter are held.

In short, first the pressure of the spring C is counterbalanced, so as to allow of the free disengagement of the balls G, then the disengagement of the latter and their movement to the rear which is immediately followed by the rearward movement of the sleeve A by the action of the spring D.

The improvements made in this known apparatus are illustrated in detail in the accompanying drawings in which:—

Fig. 2 is a sectional elevation of the improved tensioning apparatus.

Figs. 3, 4 and 5 are cross sections respectively on the lines 3—3, 4—4 and 5—5 of Fig. 2.

Figs. 6 and 7 are partial elevations showing the separating members in two different positions of operation.

Fig. 8 is a partial elevation illustrating an improved construction of separators.

Fig. 9 is an elevation illustrating a modification of the improved separators, and Fig. 10 is a section on the line 10—10 of Fig. 9.

Figure 1:
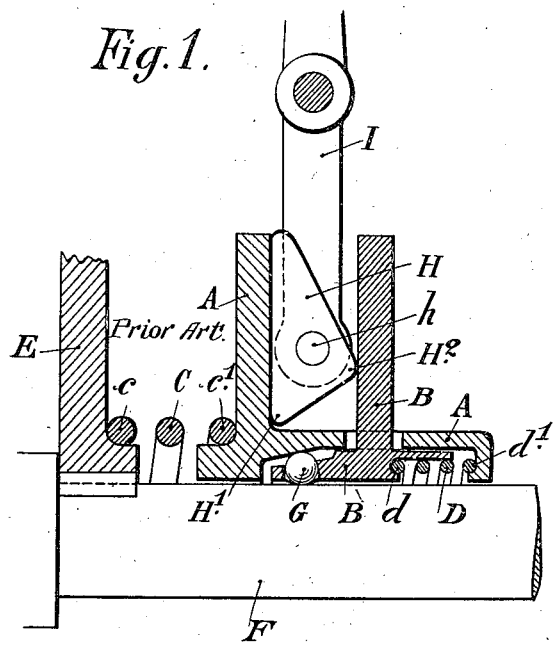
Figure 4:
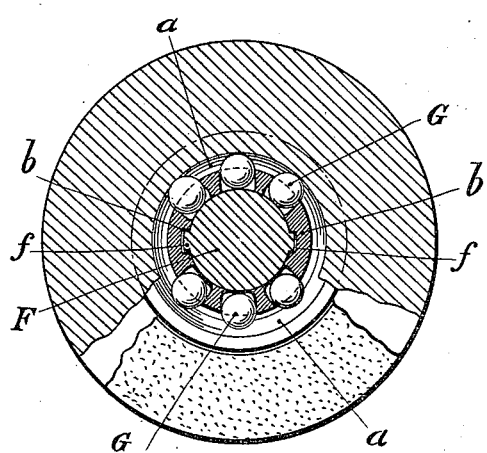

F is the driven shaft carrying a clutch part E of any suitable design, as for example, similar to that disclosed in the French patent above referred to, (of which only a portion is shown diagrammatically) against which there bears ends $c$ of springs C whose tension is to be regulated by means of the improved tensioning apparatus. The opposite ends $c^1$ of these springs bear against the improved tensioning apparatus through the medium of an annular disk $C^1$ which is mounted and held in place on said springs by any suitable means, as for example, an extending flange which engages the ends $c^1$ of the springs as illustrated. The improved tensioning apparatus comprises, as in the known construction, a sleeve A having for a portion of its length a truncated conical inner surface $a$ upon which the jamming members consisting of balls G are jammed. These balls bear at their other side upon the shaft F.

One of the improvements of the present invention consists in the particular manner of construction of the annulus B in which the balls G are lodged, and by which they are pushed along the shaft F. This annulus engages by means of grooves $b$ upon longitudinal ribs $f$ of the shaft F, and has external ribs $b^1$ by means of which it slides in corresponding grooves $a^1$ of the sleeve A.

The perfect guidance thus effected between the elements A and B of the tensioning apparatus, and of their combination A—B on the shaft F, prevents any angular displacement of the elements A and B between themselves and of the whole combination relatively to the shaft F.

On the other hand, the mounting of the combination A—B—G is greatly facilitated by the fact that the annulus B is extended on both sides of the sleeve A; the abutment $B^1$ for the separating members being taken at one of the ends thus prolonged, and the abutment for the spring D being taken on a washer $B^2$ screwed on the extension of the other end.

Another improvement of the present invention consists in an additional apparatus that allows of increasing the bearing surfaces of the separating members, against the sleeve A and also against the collar $B^1$ of the annulus B for pushing the balls along.

This additional apparatus may comprise as indicated in Fig. 8, shoes J, $J^1$ jointed respectively to the noses $H^1$ and $H^2$ of the separators H which are pivotally mounted on the opposite arms of yoke I by means of pivot pins $h$ (see Fig. 3). These shoes are simple plates having as their width the width of the separators and conforming to the shape of the large base of the latter, which form is shown by way of example in elevation in Fig. 3. The action of the separators is transmitted by the noses $H^1$ $H^2$ to the shoes which serve as intermediary parts, and the friction is thus produced between the outer faces of the said shoes and the abutments $B^1$ and A, instead of taking place between these abutments and the noses $H^1$ and $H^2$.

The additional apparatus may, as shown in the modifications illustrated in Figs. 9 and 10, be constituted by washers K and L suitably furnished with a suitable lining $k$, $l$ respectively, the mutual centering of which is assured by bars $K^1$ fixed to the washer K and surrounding the separators H. Bars $L^1$ fixed to the washer L are freely slidable on the said bars $K^1$. The springs M fixed at one end to the washer K, and at their other end to the washer L, have a tendency to keep these washers close together.

When the separators are caused to operate by a rocking movement of the operating lever I, for the purpose of opening the clutch, the nose $H^1$ of the separators proper H presses the washer K—$k$ against the sleeve A, the bearing thus taking place over the entire surface of the washer; the nose $H^2$ presses likewise the washer L—$l$ against the collar $B^1$ of the ball-pushing annulus.

The present invention also comprises, as shown in Fig. 2, the formation on the shaft F, of an annular groove $F^1$ into which the balls G engage at the end of the separating movement between the sleeve A and the ball-pushing annulus B. By this means the tensioning apparatus can be maintained readily in the non-closing position without the risk of movements of inertia producing an untimely displacement of the tensioning apparatus along the shaft, and thus, through a tensioning of the springs C, cause an untimely closing of the clutch.

The operation of the device is as follows: If the parts are in the positions as illustrated in Figs. 2 and 6 and it is desired to still further compress springs C and close the clutch parts more firmly, the operator moves the lower portion of I, and with it the separators H, toward clutch member E. This movement of separators H counterbalances the pressure of the springs C and moves sleeve A towards E, thus disengaging balls G. Separators H hold sleeve A and annulus B in the same position one with the other, but spring D acting on washer $B^2$ forces annulus B and balls G toward clutch part E so that parts A, B and G are moved together toward part E. When yoke I is released, the combined forces of springs C and D force sleeve A and balls G into wedging engagement thereby holding springs C under compression. To relieve the compression on springs C, the lower end of member I is moved in the opposite direction away from part E.

Having now particularly described and ascertained the nature of my said invention and in what manner the same is to be performed, I declare that what I claim is:—

1. In a device for closing the parts of a clutch, the combination with a shaft carrying the clutch part constituting an abutment thereon, of an abutment adjustable longitudinally on the shaft, and a spring interposed between said abutments and tending under compression to close said clutch parts, the adjustment of the adjustable abutment on the shaft operating to regulate the compression of said spring, said adjustable abutment comprising a sleeve flanged at one end and movable longitudinally on said shaft, jamming members such as balls interposed between the shaft and an incline of the sleeve, an annulus carrying the jamming members and longitudinally movable between said sleeve and shaft, a second spring normally tending to move the annulus to jam the jamming members between the shaft and the incline of the sleeve to hold the adjustable abutment in its adjustments, said annulus projecting at one end beyond the flanged end of the sleeve and having thereon a flange opposite to the sleeve flange, and a separator interposed between said opposite flanges of the sleeve and annulus and operative to separate the same to hold the sleeve against the action of the first-mentioned spring and to move the annulus against the action of the second spring to free the jamming members to release the adjustable abutment and said separator also operating to move the adjustable abutment as a whole on the shaft to compress the first-mentioned spring.

2. In a device for closing the parts of a clutch, the combination with a shaft carrying the clutch part constituting an abutment thereon, of an abutment adjustable longitudinally on the shaft, and a spring interposed between said abutments and tending under compression to close said clutch parts, the adjustment of the adjustable abutment on the shaft operating to regulate the compression of said spring, said adjustable abutment comprising a sleeve flanged at one end and movable longitudinally on said shaft, jamming members such as balls interposed between the shaft and an incline of the sleeve, an annulus carrying the jamming members and longitudinally movable between said sleeve and shaft, said annulus projecting at its ends beyond the ends of the sleeve and having a collar on one end and a flange on the other end opposite to the flange of said sleeve, a second spring interposed between the flange of said sleeve and the collar of said annulus and normally tending to move the annulus relatively to the sleeve to jam the jamming members between the shaft and the incline of the sleeve to hold the adjustable abutment in its adjustments, and a separator interposed between the opposite flanges of the sleeve and annulus and operative to separate the same to hold the sleeve against the action of the first-mentioned spring and to move the annulus against the action of the second spring to free the jamming members to release the adjustable abutment and said separator also operating to move the adjustable abutment as a whole on the shaft to compress the first-mentioned spring.

3. In a device for closing the parts of a clutch, the combination with a shaft carrying the clutch part constituting an abutment thereon, of an abutment adjustable longitudinally on the shaft, and a spring interposed between said abutments and tending under compression to close said clutch part, the adjustment of the adjustable abutment on the shaft operating to regulate the compression of said spring, said adjustable abutment comprising a sleeve movable longitudinally on said shaft, jamming members such as balls interposed between the shaft and an incline of the sleeve, an annulus carrying the jamming members and longitudinally movable between said sleeve and shaft, said annulus having longitudinal ribs and grooves registering with complementary grooves and ribs of the shaft and sleeve to prevent rotative displacement of the annulus and sleeve on the shaft, means for moving the annulus to free the jamming members, and means for moving the adjustable abutment to regulate the compression of the spring.

4. In a device for closing the parts of a clutch, the combination with a shaft carrying the clutch part constituting an abutment thereon, of an abutment adjustable longitudinally on the shaft, and a spring interposed between said abutments and tending under compression to close said clutch part, the adjustment of the adjustable abutment on the shaft operating to regulate the compression of said spring, said adjustable abutment comprising a sleeve movable longitudinally on said shaft, jamming members such as balls interposed between the shaft and an incline of the sleeve, an annulus carrying the jamming members and longitudinally movable between said sleeve and shaft, said shaft having a circumferential groove to engage the jamming members to maintain the adjustable abutment in non-closing position to prevent accidental closing, and means for moving the adjustable abutment to regulate the compression of the spring.

Dated this 4th day of August 1920.

In testimony whereof I have signed this specification.

EUGÈNE SCHNEIDER.

Witnesses:
 ANDRÉ MOSTICKER,
 LOUIS GARDET.